United States Patent
Eriten et al.

(10) Patent No.: US 12,163,929 B2
(45) Date of Patent: Dec. 10, 2024

(54) APPARATUS AND METHOD FOR CHARACTERIZING SOFT MATERIALS USING ACOUSTIC EMISSIONS

(71) Applicant: Wisconsin Alumni Research Foundation, Madison, WI (US)

(72) Inventors: Melih Eriten, Madison, WI (US); Corinne R. Henak, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 101 days.

(21) Appl. No.: 17/659,680

(22) Filed: Apr. 19, 2022

(65) Prior Publication Data

US 2023/0332992 A1 Oct. 19, 2023

(51) Int. Cl.
*G01N 3/40* (2006.01)
*G01N 29/04* (2006.01)
*G01N 29/14* (2006.01)

(52) U.S. Cl.
CPC ............... *G01N 3/40* (2013.01); *G01N 29/04* (2013.01); *G01N 29/14* (2013.01)

(58) Field of Classification Search
CPC .................................................. G01N 3/40
USPC ............................................................ 73/579
See application file for complete search history.

(56) References Cited

U.S. PATENT DOCUMENTS

| | | | |
|---|---|---|---|
| 2003/0216875 A1 | 11/2003 | Sakurai | |
| 2005/0167010 A1* | 8/2005 | Arai | C22C 19/055 148/428 |
| 2013/0118227 A1* | 5/2013 | Sakakibara | G01N 29/46 73/12.01 |
| 2013/0174666 A1 | 7/2013 | Hadj Henni et al. | |
| 2020/0309740 A1 | 10/2020 | Sato et al. | |
| 2021/0088432 A1* | 3/2021 | Van Den Bossche | G01H 17/00 |

FOREIGN PATENT DOCUMENTS

JP 2006227021 A 8/2006
WO WO-2020120909 A1 * 6/2020 ............... H04R 3/04

OTHER PUBLICATIONS

Kadowaki et al. "New Estimation Methods of Young's Modulus and Rupture Strength of Snack Foods Based on Microstructure." Journal of Texture Studies 47.1 (2016): 3-13. (Year: 2016).*
Bolzmacher et al. Translation of WO 2020120909 A1. Published Jun. 2020. Translated Sep. 2023. (Year: 2020).*
Chen, Lei, et al. "Design of a high-precision and non-contact dynamic angular displacement measurement with dual-Laser Doppler Vibrometers." Scientific Reports 8.1 (2018): 9094. (Year: 2018).*
International Search Report for PCT/US2023/017285.
Natalia I. Tymiak et al.; "Highly localized acoustic emission monitoring of nanoscale indentation contacts." Journal of materials research 18, No. 4 (Jan. 2003): pp. 784-796. US.

* cited by examiner

*Primary Examiner* — Walter L Lindsay, Jr.
*Assistant Examiner* — Philip T Fadul
(74) *Attorney, Agent, or Firm* — Boyle Fredrickson, S.C.

(57) ABSTRACT

A noncontact vibration measurement enables detection of acoustic emissions from fracture events in soft materials experimentally determined to be highly correlated to fracture energies, the latter revealing the toughness of the material.

17 Claims, 2 Drawing Sheets

APPARATUS AND METHOD FOR CHARACTERIZING SOFT MATERIALS USING ACOUSTIC EMISSIONS

STATEMENT REGARDING FEDERALLY SPONSORED RESEARCH OR DEVELOPMENT

This invention was made with government support under 1662456 and 1826214 awarded by the National Science Foundation. The government has certain rights in the invention.

CROSS REFERENCE TO RELATED APPLICATION

--

Background of the Invention

The present invention relates to the measurement of soft materials such as biological tissues, elastomeric polymers, gelatin, and the like, and in particular to a method of characterizing these materials by measuring the energy released during the propagation of internal fractures when the material is stressed.

The determination of failure thresholds, for example, the nucleation of internal cracks in a material, can provide important insights into hard materials such as ceramics, concrete, and composites related to their load carrying capacity and toughness. These cracks can be detected by acoustic emissions measured by sensors attached to the material as caused by the crack propagation. These acoustic emissions can then be mapped to the energy released by the crack, this energy, in turn, revealing important information about the material such as nucleation energy (energy to failure) and toughness.

SUMMARY OF THE INVENTION

The present inventors have determined that a similar technique, as used with hard and brittle materials such as ceramics, can be applied to soft materials. Experiments conducted by the inventors have established that a relationship between cumulative energy of acoustic emissions and energy-to-crack formation applies to soft materials having acoustic emissions many orders of magnitude lower than that of harder materials such as ceramic. In this regard, the present invention may employ a noncontact measurement of waves close to the failure zone to reduce attenuation in acoustic emission amplitudes without the added mass or stiffness of the vibration-measuring device. Because these characterizations of acoustic emissions do not rely on precise measurement of the force and deformation of the material, these measurements can be incorporated into a variety of real-time processes where cracking occurs from an ancillary process such as cutting of the material.

More specifically, in one embodiment, the invention provides an apparatus for the analysis of soft materials having a sharp probe adapted to contact the soft material and an actuator communicating with the probe and pressing the probe in contact with the soft material along a force axis to generate fracture events. A noncontact vibration sensor obtains a vibration signal from measured acoustic emissions of at least one fracture event during pressing of the probe, and an electronic processor receives the vibration signal to provide an output indicating energy released during the fracture event.

It is thus a feature of at least one embodiment of the invention to provide a method of characterizing the toughness of soft materials through the monitoring of acoustic emissions from fracture events.

The electronic processor may determine an energy of the vibration signal and maps that energy to energy released during the fracture event according to an empirically determined relationship.

It is thus a feature of at least one embodiment of the invention to provide a quantitative output related to energy released by the fracture event.

The noncontact vibration sensor may be a laser vibrometer.

It is thus a feature of at least one embodiment of the invention to provide a versatile noncontact vibration sensor easily integrated into a variety of processes and able to measure a variety of materials to the necessary sensitivity.

The noncontact vibration sensor may measure vibration at a location within a one-centimeter radius from the probe.

It is thus a feature of at least one embodiment of the invention to provide a method of capturing acoustic emissions of soft materials subject to high attenuation with distance.

The noncontact vibration sensor measures vibration of a surface of the material along the normal axis.

It is thus a feature of at least one embodiment of the invention to provide a method measuring readily accessible and monitored surface shear waves.

When the noncontact vibration sensor is a laser vibrometer, it may be oriented to direct a laser beam at an angle to the axis and the electronic processor may perform a trigonometric correction to determine vibration along the normal axis.

It is thus a feature of at least one embodiment of the invention to allow close proximity of the measurement site to the probe by angling of the laser beam with respect to the probe structure.

The vibration signal may be band limited to less than 50 kHz.

It is thus a feature of at least one embodiment of the invention to provide a system adapted for capturing low-frequency acoustic emissions associated with soft materials.

The electronic processor may further analyze frequency content of the vibration signal provide an output indicating a measure of stiffness of the soft material.

It is thus a feature of at least one embodiment of the invention to extract additional data from the acoustic emissions that can provide a stiffness indication.

The electronic processor may isolate fracture events from the vibration signal separated by periods of low amplitude to separately analyze at least one single fracture event with respect to the output indicating energy released during the fracture event.

It is thus a feature of at least one embodiment of the invention to exploit the episodic nature of fracture events to provide clear analysis of material toughness.

In some embodiments, the probe may be a knife operating to cut the soft material.

It is thus a feature of at least one embodiment of the invention to provide a method of characterizing materials that can be readily integrated into manufacturing processes where those materials are cut or the like as part of the manufacturing process.

The knife may be a surgical sharp having a handle and a flexible light conduit attached to the handle and conducting light from a laser vibrometer to a point proximate to the blade.

It is thus a feature of at least one embodiment of the invention to provide a system allowing analysis of biological tissues, for example, during surgery using a surgical sharp as the promoting fracture event, and thus to be able to distinguish tissues by toughness.

These particular objects and advantages may apply to only some embodiments falling within the claims and thus do not define the scope of the invention.

DETAILED DESCRIPTION OF THE PREFERRED EMBODIMENT

Figure 1:
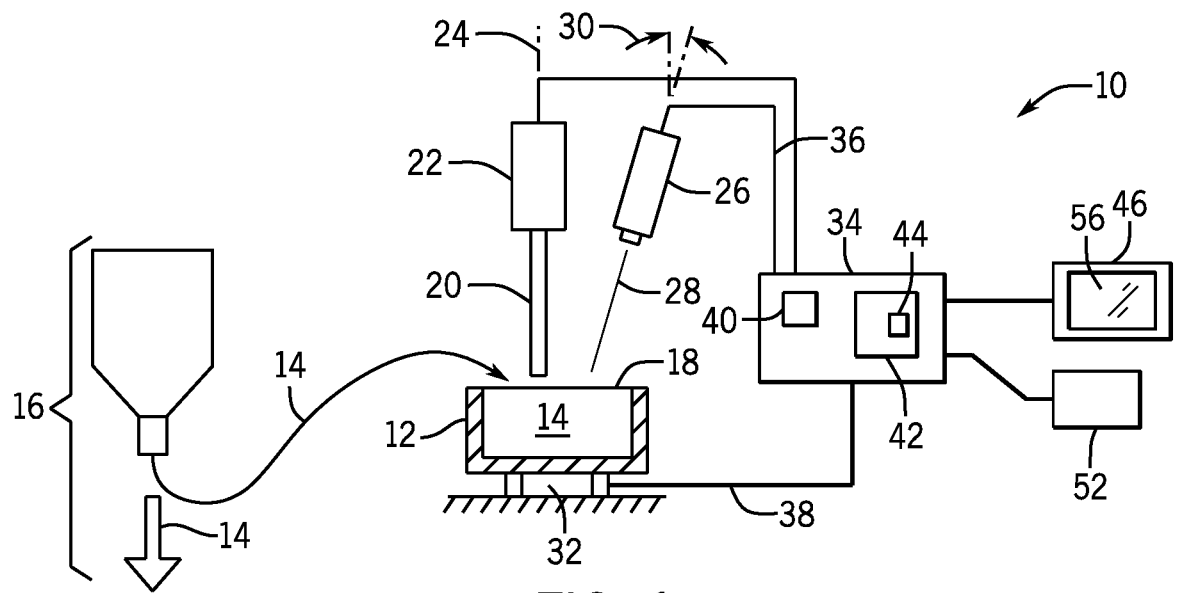
FIG. 1 is a simplified block diagram of an apparatus for characterizing soft materials in a first embodiment that can be used both for batch measurement and for characterization of the measuring instrument, the apparatus providing a load cell, and actuator, and a noncontact vibrometer communicating with an electronic processor.

Referring now to FIG. 1, an apparatus 10 for characterizing soft materials according to a first embodiment of the invention may provide for a sample container 12 (shown in cross-section) having a lower horizontal wall and peripheral upstanding walls open at an upper rim.

The sample container 12 may receive a soft material 14, for example, as part of a routine testing of materials from a batch or continuous process 16 providing a stream of soft material 14 for use in a manufacturing process or the like. Example soft materials 14 include polymer material such as polymer elastomers, food products such as cheese or gelatins, and construction materials such as foam or paper products. In many cases, the soft material 14 will be characterized by a Young's modulus of less than 1000 kPa, such as would include, for example, such materials as cheddar cheese (240 kPa) and hydrogels (less than 150 kPa).

The exposed upper surface 18 of the soft material 14 may receive a probe 20 movable by an actuator 22 along a vertical axis 24 substantially normal to the surface 18. In this example, the probe 20 may provide a cylinder extending along axis 24 having a diameter of 1-6 mm and may be moved by the actuator 22 at a displacement rate of 1-10 mm/s so that a bottom circular surface of the probe 20 contacts and presses into the soft material 14.

A noncontact vibrometer 26, for example, a laser Doppler Vibrometer commercially available from Polytec GmbH of Waldbronn, Germany, may be positioned to direct a near infrared laser beam 28 at the surface 18 proximate to a region of the soft material 14 contacting the distal end of the probe 20. Ideally, the laser beam 28 strikes the surface 18 at a point close to the probe 20 to overcome the rapid attenuation of the acoustic signals to be measured. In one embodiment, the laser is positioned within 1.5 mm and 3 mm of the tip of the probe 20 (for a 3 mm and 6 mm probe 20, respectively) and generally within 1 cm of the probe contact location. In order to provide a proximate measurement point for the vibrometer 26 close to the probe 20 but without interference between the vibrometer 26 and the actuator 22, the laser beam 28 may be angled at an angle 30 with respect to the axis 24 and/or a surface normal of the surface 18 while being oriented as close to that surface normal or axis as practical for improved reflection capture. Reflectivity variations in soft material 14, particularly off axis, may be accommodated by a light dusting of an opaque powder such as titanium dioxide on that surface 18 in an amount providing negligible mass and stiffness that might affect the measurement. For example, Industrial Scientific Titanium Dioxide Powder (44 µm 99% Pure) commercially available from Loud Wolf of Dublin, California, may be used. Employing a near infrared laser beam 28 (e.g., 1550 nm) may also provide enhanced reflection on some surfaces.

In one embodiment, the sample container 12 may be supported by a load cell 32 providing a measurement of the force applied by the probe 20 to the soft material 14 as may be used to establish an empirical model for operation of the invention as will be discussed.

The load cell 32, actuator 22, and vibrometer 26 may communicate electrically with an electronic processor 34, for example, providing an electrical signal to control actuation of the actuator 22 and receiving a vibration signal 36 from the vibrometer 26 measuring velocity fluctuations in the height of the surface 18 at the contact point of the laser beam 28 and a load signal 38 from the load cell 32 measuring force applied by the probe 20 as may be netted from the weight of the sample container 12 and contained soft material 14.

Electronic processor 34 may be a dedicated circuit such as an application-specific integrated circuit or an assemblage of discrete components or an electronic computer including a general-purpose processor 40 communicating with electronic memory 42 holding a stored program 44 and necessary data including comparable conversion or mapping tables for mapping acoustic emission energy to fracture energy as will be discussed below. The processor 34 may also communicate with a display 46 to which it may output quantitative or qualitative information 50 related to measurements conducted by the apparatus 10 and a keyboard or other input device 52 for controlling operation of the apparatus 10 by providing input to the processor 34 as will be understood from the following description.

Figure 2:
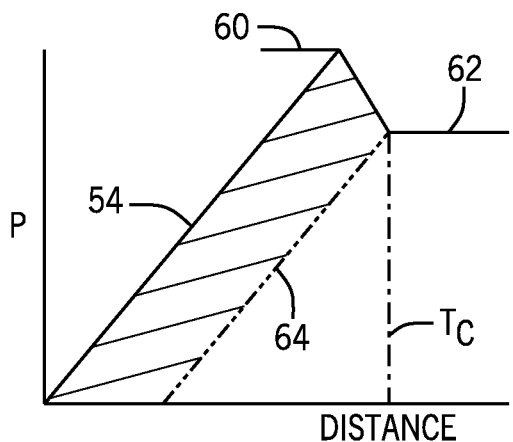
FIG. 2 is a graph showing the determination of fracture energy using the instrument of FIG. 1.

Referring now to FIG. 2, during the calibration of the apparatus 10, the probe 20 may be lowered at a continuous rate against the soft material 14 and pressure or force monitored over the distance of lowering by the load cell 32 to produce a load profile 54 of sample points collected by the processor 34 plotting force or pressure against displacement. The displacement may be deduced by direct measurement of the location of the plunger 20 or by integration of its velocity.

At a crack nucleation level 60 of displacement, fracture events will occur in which the soft material 14 exhibits localized sudden points of separation causing a rapid decrease in the value of the pressure profile 54 to a relief state 62 resulting from a relief of force by an internal fracture at a fractured time $t_c$. The fracture energy $W_f$ associated with the fracture will be the area under the pressure profile 54 up to the time $t_c$ above a displaced curve 64, the mirroring the load profile up to the release state 62 and shifted rightward to $t_c$. The area under the displaced curve 64 represents the energy of compression of the soft material 14 or critical work before the fracture nucleation and approximates the recoverable energy from the soft material when the probe 20 is withdrawn upward. This fracture energy $W_f$ provides an indication of the toughness of the material.

Importantly, and as will now be described, a determination of fracture energy $W_f$ can be obtained by the present invention through measurement of acoustic emission energy released by the fracture without the need for the load cell 32 or the ability to isolate the soft material 14 in such a way that measurements of the force of the probe 20 can be obtained directly, allowing a characterization of toughness of the soft material in a variety of important industrial and commercial applications where direct measurement of probe force is impractical or would be obscured.

For this latter application and also during calibration, during the collection of the force and displacement information shown in FIG. 2 for the determination of fracture energy $W_f$, the processor 34 also collects a vibration signal 36 from the vibrometer 26. The amplitude of the vibration signal 36 indicates a velocity of a change in height of the soft material caused by shear waves produced by a fracture event (acoustic emissions) distorting the upper surface 18. The vibration signal 36 may, for example, be band limited to less than 50 kHz and sampled at a rate of approximately 100 kHz. Generally, the important information from the vibration signal 36 will be concentrated below 500 Hz and accordingly the vibration signal 36 may be further filtered to this range. In addition, to the extent that the angle of the laser beam 28 is not perfectly normal to the surface 18 or aligned with the axis 24, the vibration signal 36 received by the processor 34 may be trigonometrically corrected, for example, by dividing the received signal by the cosine of angle 30.

The resulting vibration signal 36 may then be processed to extract its energy, for example, by integrating the area under the curve being the square of values of the vibration signal 36 per the following equation:

$$E_i = \int v_i^2 dt \tag{1}$$

where $E_i$ is the cumulative energy up to time point i; and $v_i$ is the vibration signal at a time point i.

Figure 3:
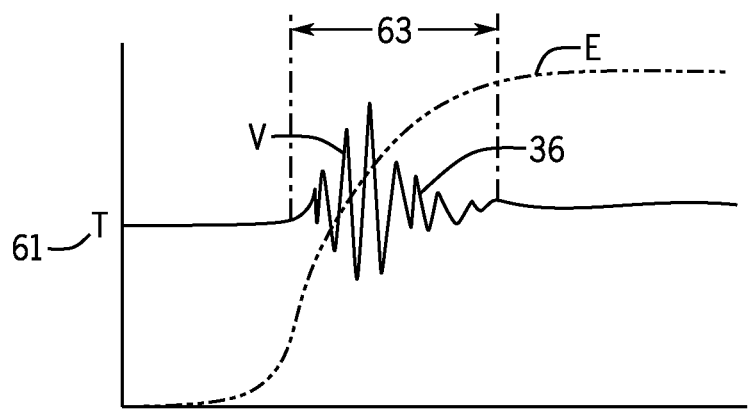
FIG. 3 is a graph showing detected acoustic energy from the noncontact vibrometer during the fracture of FIG. 2.

Referring still to FIG. 3, the beginning and end of the fracture event 63 can be identified, for example, by defining an amplitude threshold 61 characterizing a fracture event, and the energy of that acoustic pulse during this event determined by the difference between values of E at the beginning and end of the pulse. The total acoustic pulse energies can be determined for one or more fracture events individually and a single event selected, for example, being the first fracture event or that with the largest total energy, or the total energy of multiple events individually determined and then averaged or otherwise combined.

For the purpose of calibration, this process determines the fracture energy $W_f$ and a corresponding acoustic emission. Energy E for a given fracture event may be repeated for different samples of soft materials 14 with properties that vary with respect to a propensity to fracture or toughness. These multiple determinations with or without varied samples of soft material 14 allow the development of a correlation between the acoustic pulse energy E and the fracture energy $W_f$ so that fracture energy $W_f$ can be deduced directly from acoustic pulse energy E. When multiple different samples of soft material 14 are used, a polynomial may be fit to this relationship between acoustic pulse energy E and fracture energy $W_f$ that is more sensitive to variations in fracture energy $W_f$ in a range of materials.

In all cases, the derived relationships may be used by the processor 34 to assess the property of soft material 14 with respect to fracture energy $W_f$ from the measurement of acoustic emission energy E without the need for the load cell 32 or access to the soft material 14 that would allow similar measurements as made by the load cell 32.

Figure 4:
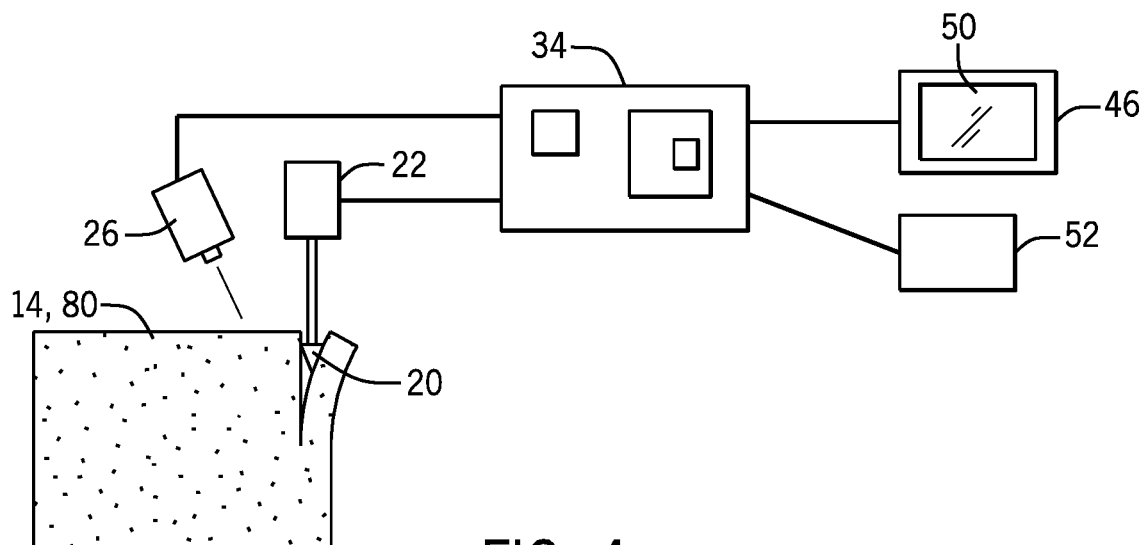
FIG. 4 is a figure similar to FIG. 1 showing monitoring a material during an ancillary cutting process without the load cell or similar structure.

Referring now to FIG. 4, in one example, the probe 20 may be a knife or cutter, for example, for processing a product 80 composed of a soft material 14 during the manufacturing process, for example, during slicing, scoring, mincing, or the like. Data collected by the vibrometer 26 during this cutting process may then be used to determine the toughness of the product 80 by monitoring acoustic emissions alone. In this way quality of the properties of the products may be continuously monitored, and/or the process of the cutting may be varied in a feedback loop according to the measured properties to better match the current material properties.

Figure 5:
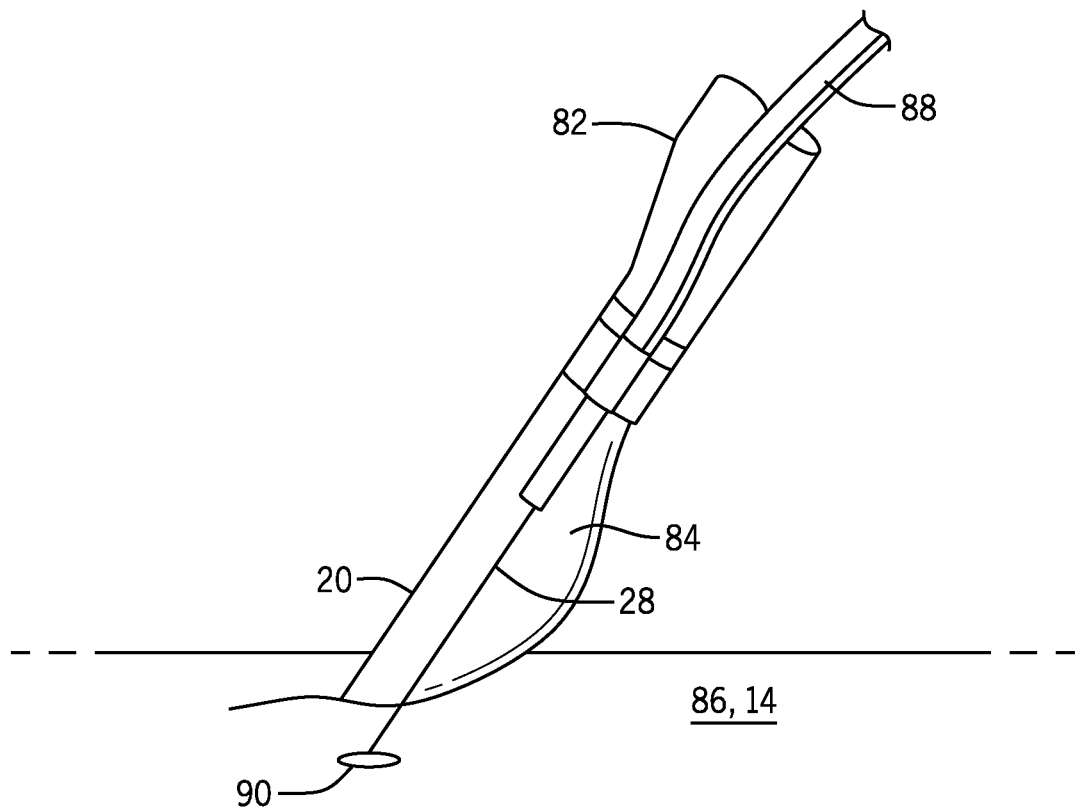
FIG. 5 is a fragmentary view of a surgical scalpel having a light conduit for laser vibrometery during surgical procedures.

Referring now to FIG. 5, the invention may find use in the analysis of biological tissues, for example, in tumor tissue where a resistance to fracturing may provide an indication of the underlying structure or type of the tissue. A continuous monitoring, in this context, can be helpful, for example, during surgical procedures to ensure that the full margins of a tumor are excised. In this situation, a cutting instrument 82 such as a scalpel having a blade 84 may be used to cut biological tissue 86 representing the soft material 14. The blade 84 thus operates as the probe 20 in the invention above. An optical fiber 88, for example, may be integrated to the side of the scalpel 82 to project a laser beam 28 from a noncontact vibrometer 26 (not shown) along the blade to illuminate and measure a region 90 adjacent to the cutting location to detect acoustic emissions and characterize the tissue being cut by those emissions. A real-time indication of tissue characteristics may be provided through display 50 (shown in FIG. 1) and may be provided to the physician during a surgical procedure or data may be collected for later analysis.

It will be appreciated the invention need not be limited solely to the collection of energy of acoustic emissions but may also analyze the duration of the acoustic emissions, the rise time of the energy profile, the peak energy or peak velocity of the acoustic emissions and their frequency spectrum, power spectrum, and/or fundamental frequency. The fundamental frequency may indicate information about material stiffness that can be used to augment the information about toughness described above further characterizing the soft material 14. These other measures may be combined or individually correlated with quasi-static elastic and fracture properties of the material.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more computer processors that can communicate in a stand-alone and/or a distributed environment(s), and can thus be configured to communicate via wired or wireless communications with other processors, where such one or more processors can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. An apparatus for the analysis of soft materials comprising:
   a probe adapted to contact the soft material;
   an actuator communicating with the probe and providing a predetermined controlled of rate of displacement of the probe after the probe is in contact with the soft material along a force axis to generate fracture events;
   a noncontact vibration sensor generating a vibration signal from measured acoustic emissions of at least one fracture event during pressing of the probe; and
   an electronic processor receiving the vibration signal to provide an output indicating energy released during the fracture event.

2. The apparatus of claim 1 wherein the electronic processor determines an energy of the vibration signal and maps that energy to energy released during the fracture event according to an empirically determined relationship.

3. The apparatus of claim 1 wherein the noncontact vibration sensor is a laser vibrometer.

4. The apparatus of claim 1 wherein the noncontact vibration sensor measures vibration at a location within a one-centimeter radius from the probe.

5. The apparatus of claim 1 wherein the noncontact vibration sensor measures vibration of a point on a surface of the material surface along the force axis.

6. The apparatus of claim 1 wherein noncontact vibration sensor is a laser vibrometer oriented to direct a laser beam at an angle to the force axis and the electronic processor performs a trigonometric correction to determine vibration along the force axis.

7. The apparatus of claim 1 wherein the vibration signal is band limited to less than 50 kHz.

8. The apparatus of claim 1 wherein the electronic processor further analyzes a frequency content of the vibration signal to provide an output indicating a stiffness of the soft material.

9. The apparatus of claim 1 wherein the electronic processor isolates fracture events from the vibration signal separated by periods of low amplitude to separately analyze at least one single fracture event with respect to the output indicating energy released during the fracture event.

10. The apparatus of claim 1 wherein the electronic processor further outputs an indication of maximum vibration amplitude, duration of a fracture event, or rise time of acoustic energy of a fracture event.

11. The apparatus of claim 1 wherein the output provides a quantitative energy value.

12. The apparatus of claim 1 further including a display displaying the output.

13. The apparatus of claim 1 wherein the probe is a knife operating to cut the soft material.

14. The apparatus of claim 13 wherein the knife is a surgical sharp having a handle and a flexible light conduit attached to the handle and conducting light from a laser vibrometer to a point proximate to the blade.

15. A method of characterizing soft materials employing an apparatus providing:
    a probe adapted to contact the soft material;
    an actuator communicating with the probe and providing a predetermined controlled rate of displacement of the probe after the probe is in contact with the soft material along a force axis to generate fracture events;
    a noncontact vibration sensor generating a vibration signal from measured acoustic emissions of at least one fracture event during pressing of the probe; and
    an electronic processor receiving the vibration signal to provide an output indicating energy released during the fracture event, the method including:
    (a) applying force to the probe in contact with a soft material along the force axis to generate fracture events;
    (b) monitoring a vibration signal from acoustic emissions of at least one fracture event in the soft material; and
    (c) outputting a value indicating energy released during the fracture event derived from the vibration signal.

16. The apparatus of claim 1 wherein the electronic processor further outputs a load profile plotting force or pressure against displacement.

17. The method of claim 15 where in the soft material has a Young's modulus of less than 1000 kPa.

* * * * *